S. J. KEMPIN.
PARACHUTE LAUNCHING DEVICE.
APPLICATION FILED MAY 29, 1919.

1,325,441.

Patented Dec. 16, 1919.
2 SHEETS—SHEET 1.

WITNESSES

INVENTOR
S.J.KEMPIN
BY
ATTORNEYS

S. J. KEMPIN.
PARACHUTE LAUNCHING DEVICE.
APPLICATION FILED MAY 29, 1919.

1,325,441.

Patented Dec. 16, 1919.

WITNESSES

INVENTOR
S. J. KEMPIN
BY
ATTORNEYS

UNITED STATES PATENT OFFICE.

STANISLAUS J. KEMPIN, OF MINNEAPOLIS, MINNESOTA.

PARACHUTE-LAUNCHING DEVICE.

1,325,441.   Specification of Letters Patent.   Patented Dec. 16, 1919.

Application filed May 29, 1919. Serial No. 300,670.

*To all whom it may concern:*

Be it known that I, STANISLAUS J. KEMPIN, a citizen of the United States, and a resident of Minneapolis, in the county of Hennepin and State of Minnesota, have invented a new and Improved Parachute-Launching Device, of which the following is a full, clear, and exact description.

This invention relates to a parachute, and aims to provide a device of this nature more particularly applicable to flying machines; and, further, to provide a structure associated with such parachute whereby the same will open instantly before a load is even placed upon it, so that in case it should become necessary to utilize the device close to the ground no fears would have to be entertained on the part of the operator that the parachute might not open in sufficient time to break his fall.

A further object of the invention is the provision of means associated with a flying machine which shall normally house a parachute so that the same may be completely out of sight but in which said parachute will be projected outwardly and opened simultaneously whereby to be capable of carrying a load the instant the operator may desire.

A still further object of the invention is the provision of a parachute arranged in a flying machine which shall normally be out of sight of the operator of said machine and in which the suspending cables are attached to the operator of said machine in such a manner as to cause no inconvenience on his part.

Having these objects in mind reference is had to the attached sheets of drawings, in which—

Figure 1:
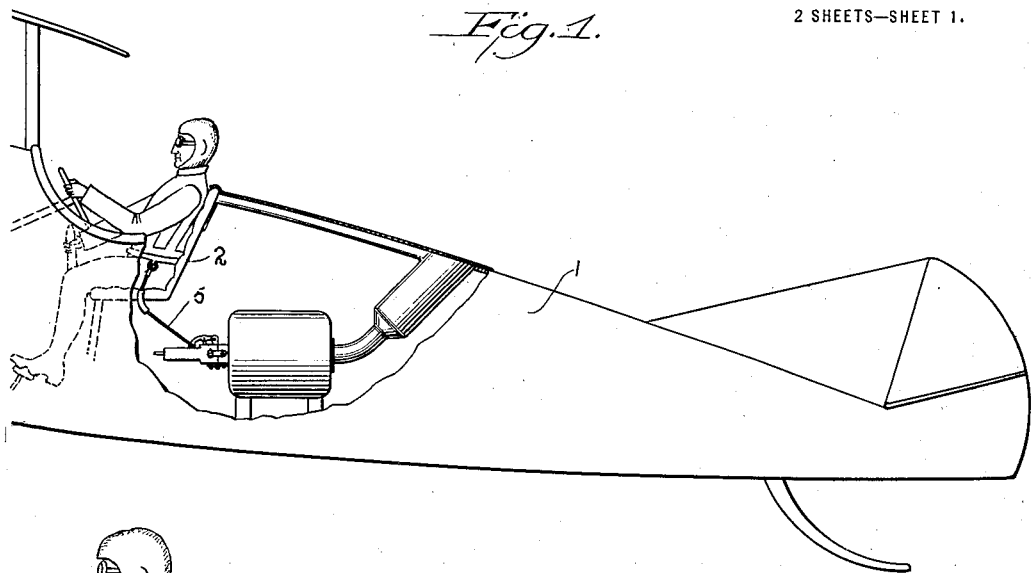
Figure 1 is a side elevation, partly in section, of a flying machine, showing the exterior of the parachute housing and projecting mechanism.

In all of these views like reference numerals designate similar parts, and the reference numeral 1 indicates the fuselage of an airplane, which is provided with the usual operator's seat 2. A groove 3 extends rearwardly from the operator's seat and communicates with a cylindrical casing, such as 4, which is open at its upper end.

Extending within easy reach of the operator is a cord, such as 5, which is connected to an explosive charge-firing mechanism, such as a spring-projected plunger 6, slidably mounted in the breech 7 and released upon a pull being exerted on the trigger 8 to which the cord 5 is connected. A short barrel 9 connects with the breech 7 and has housed within it a cartridge of powder or other explosive material 10. Enveloping the inner end of the barrel 9 is a casing, such as 11, and interposed between the side walls of the casing, and completely inclosing the end of said barrel, is a flame arrestor 12, of any suitable construction, provided with a flame-deflecting plate 13. The housing 11 has an opening in its rearmost end from which projects a tube 14 extending into the cylindrical casing 4, such tube being formed with openings 15 affording communication between the interior thereof and the casing 4.

A parachute, including a supporting body 16 from which extends supporting cords 17, envelops the end of the tube 14 projecting within the casing 4. The cords 17 lie within the groove 3 and have their lowermost ends secured to the belt, or suspending harness, of the operator, as shown in the views. Secured to the fuselage by means of sewing, pasting or any other suitable means, is a strip of frangible material, such as 18, which effectually incloses the upper half of the groove 3 and the upper end of the cylindrical casing 4.

Figure 2:
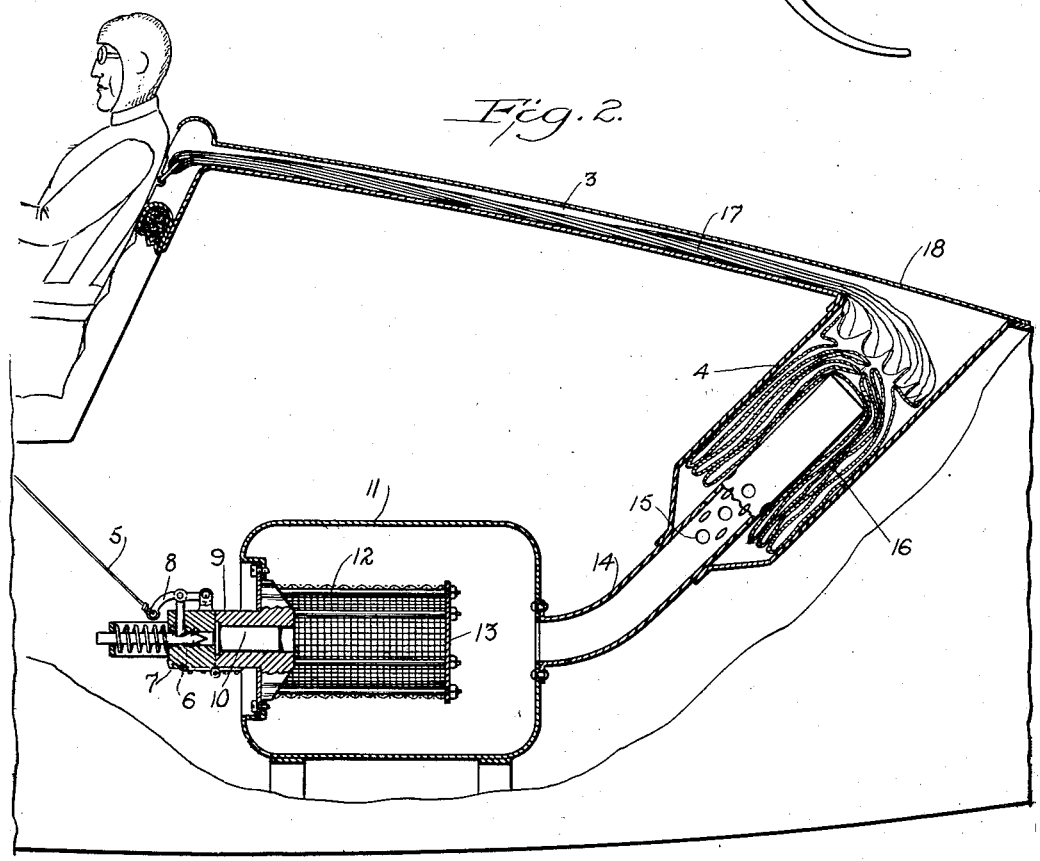
Fig. 2 is an enlarged sectional view of the parts illustrated in Fig. 1.
Figure 3:
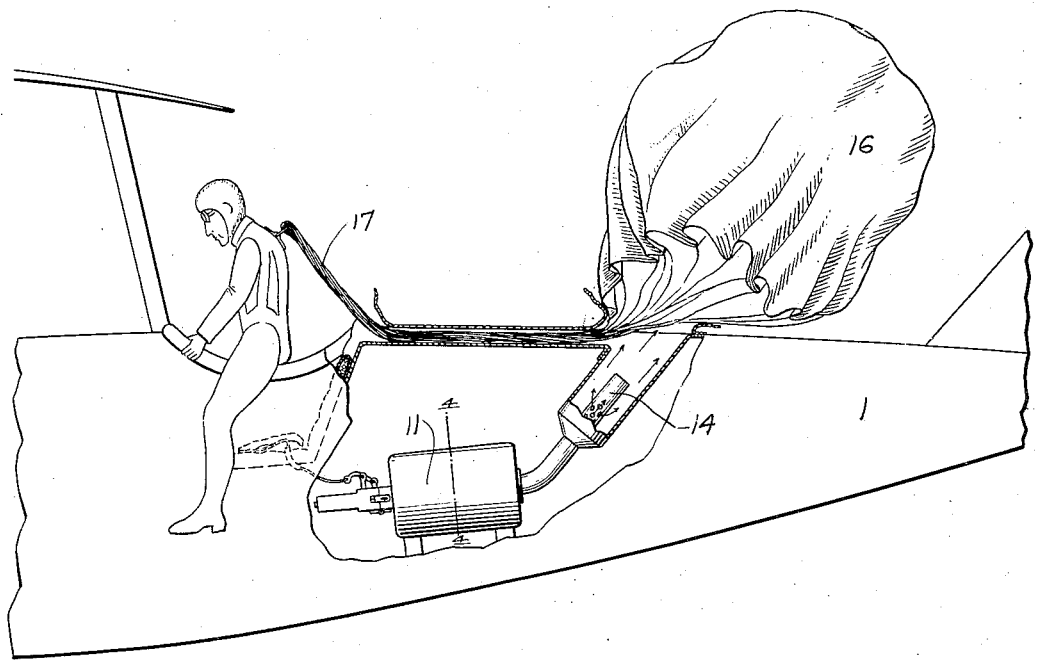
Fig. 3 is a view similar to Fig. 1, disclosing the parts and parachute immediately after the operator has set the apparatus to functioning.
Figure 4:
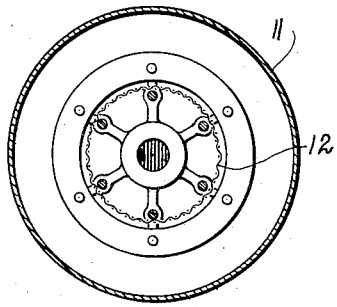
Fig. 4 is a sectional view taken along the line 4—4 of Fig. 3.
Figure 5:
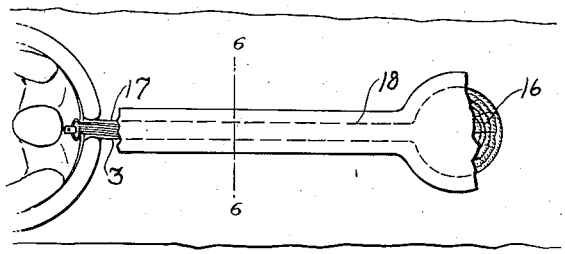
Fig. 5 is a top plan view, partly in section, of the fuselage of a flying machine with the device in applied position.
Figure 6:
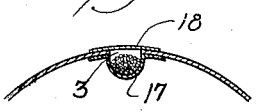
Fig. 6 is a sectional view taken along the line 6—6 of Fig. 5.

In operation it will now be seen that normally the parachute and the projecting mechanism are in the position indicated in Figs. 1 and 2. Considering now that for any reason the operator should find it necessary to abandon the machine, all that it is necessary for him to do is to exert a pull upon the cord 5, which will result in the releasing of the plunger 6 by means of the trigger 8 and the consequent firing of the charge 10 within the breech 7, resulting in the sudden explosion of gases within the casing 11, which gases will be projected through the tube 14 and into the cylindrical casing 4, from which it will not be possible for them to escape by reason of the positioning therein of the parachute 16. Consequently the parachute 16 will be projected outwardly through the frangible material 18 into the position indicated in Fig. 3. The operator in the meantime may raise himself, as also indicated in Fig. 3, so that no possibility of the cords 17 becoming entangled with any of the structure of the machine exists.

Further, it will be appreciated that by virtue of the provision of the flame arrester 12 and its associated plate 13, no danger exists of the parachute becoming burned by the exploding charge contained within the cartridge 10.

It will be understood that various modifications of structure may be made without in the least departing from the scope of my invention.

Having thus described my invention, I desire to claim:

1. A parachute launching device, including a housing compartment formed within an airship, a parachute housed within such compartment, the suspending cords of said parachute being attached to the operator of the airship, means for igniting an explosive charge, further means for conducting the explosive gases created upon the exploding of said charge into the compartment, and means interposed between said charge and compartment for arresting the flames caused by such charge.

2. A parachute launching device, including a compartment formed within the body of an airship, a groove formed in the upper face of the fuselage of the airship and extending between the compartment and the operator's seat, and a parachute housed within such compartment and having its suspending cords positioned within such groove and having their lowermost ends secured to the operator.

3. A parachute launching device, including a compartment formed within the body of an airship, a groove formed in the upper face of the fuselage of the airship and extending between the compartment and the operator's seat, a parachute housed within such compartment and having its suspending cords positioned within such groove and having their lowermost ends secured to the operator, and frangible means inclosing the upper half of the groove and the open end of the compartment.

4. A parachute launching device, including a housing compartment formed within an airship, a parachute housed within such compartment, the suspending cords of said parachute being attached to the operator of the airship, means for igniting an explosive charge, further means for conducting the explosive gases created upon the exploding of said charge into the compartment, and a flame arrester having associated with it a flame-deflecting plate interposed between such charge and compartment.

STANISLAUS J. KEMPIN.